United States Patent
Herrmann et al.

(10) Patent No.: US 10,958,366 B2
(45) Date of Patent: Mar. 23, 2021

(54) METHOD OF RECORDING A FORTHCOMING TELEBROADCAST PROGRAM

(71) Applicant: SAGEMCOM BROADBAND SAS, Rueil-Malmaison (FR)

(72) Inventors: Laurent Herrmann, Rueil Malmaison (FR); Julien Sebire, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/470,463

(22) PCT Filed: Nov. 3, 2017

(86) PCT No.: PCT/EP2017/078224
§ 371 (c)(1),
(2) Date: Jun. 17, 2019

(87) PCT Pub. No.: WO2018/114108
PCT Pub. Date: Jun. 28, 2018

(65) Prior Publication Data
US 2020/0092021 A1    Mar. 19, 2020

(30) Foreign Application Priority Data
Dec. 19, 2016 (FR) ..................... 16 62793

(51) Int. Cl.
*G06F 3/00* (2006.01)
*G06F 13/00* (2006.01)
(Continued)

(52) U.S. Cl.
CPC ............ *H04H 60/27* (2013.01); *H04N 5/775* (2013.01); *H04N 21/4147* (2013.01);
(Continued)

(58) Field of Classification Search
CPC .... H04H 60/27; H04N 5/775; H04N 21/4147; H04N 21/42207; H04N 21/4334; H04N 21/4394; H04N 21/44008
See application file for complete search history.

(56) References Cited

U.S. PATENT DOCUMENTS

2009/0328100 A1*  12/2009  Horiguchi .......... H04N 21/4394
                                                        725/39
2010/0129067 A1*  5/2010  Nagano ............ G11B 20/00086
                                                        386/334
(Continued)

FOREIGN PATENT DOCUMENTS

DE   10 2007 030 131 B3   10/2008
EP      2 173 093 A2       4/2010
EP      2 552 111 A1       1/2013

*Primary Examiner* — Kyu Chae
(74) *Attorney, Agent, or Firm* — Muncy, Geissler, Olds & Lowe, P.C.

(57) ABSTRACT

Method of recording a program, a broadcasting of which is advertised by a trailer, the recording method comprising the steps: of continuously recording a telebroadcast program while it is being viewed by the user while preserving the recording at least over a recording period preceding a present viewing instant; when the trailer of the forthcoming telebroadcast program is broadcast, of receiving a recording request signal; of analyzing the recording of the telebroadcast program while it is being viewed over the recording period preceding the reception of the recording request signal so as to obtain programming parameters; of recording the forthcoming telebroadcast program by using the programming parameters.

10 Claims, 2 Drawing Sheets

(51) Int. Cl.
*H04N 5/445* (2011.01)
*H04N 7/173* (2011.01)
*H04N 7/16* (2011.01)
*H04H 60/27* (2008.01)
*H04N 5/775* (2006.01)
*H04N 21/4147* (2011.01)
*H04N 21/433* (2011.01)
*H04N 21/439* (2011.01)
*H04N 21/44* (2011.01)
*H04N 21/41* (2011.01)

(52) U.S. Cl.
CPC ... *H04N 21/41265* (2020.08); *H04N 21/4334* (2013.01); *H04N 21/4394* (2013.01); *H04N 21/44008* (2013.01)

(56) References Cited

U.S. PATENT DOCUMENTS

| | | | |
|---|---|---|---|
| 2010/0275228 A1* | 10/2010 | Panje | H04N 21/44004 725/38 |
| 2013/0038527 A1 | 2/2013 | Komai | |
| 2016/0087735 A1* | 3/2016 | Anniballi | G06F 21/32 455/3.01 |
| 2016/0373796 A1* | 12/2016 | Schneiderman | H04N 21/278 |

* cited by examiner

METHOD OF RECORDING A FORTHCOMING TELEBROADCAST PROGRAM

BACKGROUND OF THE INVENTION

When a trailer is broadcast on TV and a user desires to record the forthc2oming broadcast program that is to be broadcast as announced in the trailer, the user needs to perform various operations.

The user needs to make use of a programming menu to input programming information as supplied while the trailer is being broadcast. By way of example, the programming information may comprise the start time of the program, the end time of the program, the broadcast channel on which the program is to be broadcast, and the title of the program.

Alternatively, the user needs to scan through an electronic program guide (EPG) searching for the program that is to be recorded. The electronic program guide may have several pages.

Both of those two methods are relatively complex, not very ergonomic, and above all they are slow to put into effect.

Several types of solution have been devised for mitigating those drawbacks.

A first type of solution enables a program to be recorded on the basis of programming information contained in a video stream received by the TV or by a decoder box (or "set-top" box) connected to the TV. That first type of solution nevertheless requires the programming information to be previously encoded in a language that the TV or the decoder box can understand.

A second type of solution consists in using an external scanner to recognize printed characters on a printed TV program guide. That second type of solution is firstly not very practical to carry out because it requires the use of an external scanner, and secondly it is not well adapted to our modern age, since fewer and fewer users make use of printed TV program guides.

OBJECT OF THE INVENTION

An object of the invention is to provide a method of recording a forthcoming broadcast program that does not present the above-mentioned drawbacks.

SUMMARY OF THE INVENTION

In order to achieve this object, there is provided a recording method for recording a forthcoming broadcast program that is to be broadcast as announced by a trailer being viewed by a user, the recording method comprising the steps of:

continuously recording broadcasting that is being viewed by the user and conserving that recording at least over a recording period preceding the present viewing instant;

while the trailer of the forthcoming broadcast program is playing, receiving a recording request signal issued by the user;

analyzing the recording of the broadcasting that is being viewed over the recording period preceding reception of the recording request signal in order to obtain programming parameters;

recording the forthcoming broadcast program by using the programming parameters.

In order to record the forthcoming broadcast program, the user needs only to send the recording request signal to a piece of equipment, such as a decoder box connected to a TV, in which the recording method of the invention is performed. By way of example, the recording request signal may be sent by pressing on a button of a remote control. The user therefore does not need to input programming information directly or to run through an electronic program guide, but only to send a recording request signal during or after playing of the trailer.

The recording method of the invention does not require specific programming data to be encoded in the video stream received by the decoder box.

There is also provided a decoder box including processor means arranged to perform the recording method as described above.

There is also provided a computer program including instructions enabling equipment of the decoder box type to perform the recording method as described above.

There are also provided storage means, that store a computer program including instructions enabling equipment of the decoder box type to perform the recording method as described above.

Other characteristics and advantages of the invention appear on reading the following description of a particular, non-limiting implementation of the invention.

BRIEF DESCRIPTION OF THE DRAWINGS

Reference is made to the accompanying drawings, in which.

DETAILED DESCRIPTION OF THE INVENTION

Figure 1:
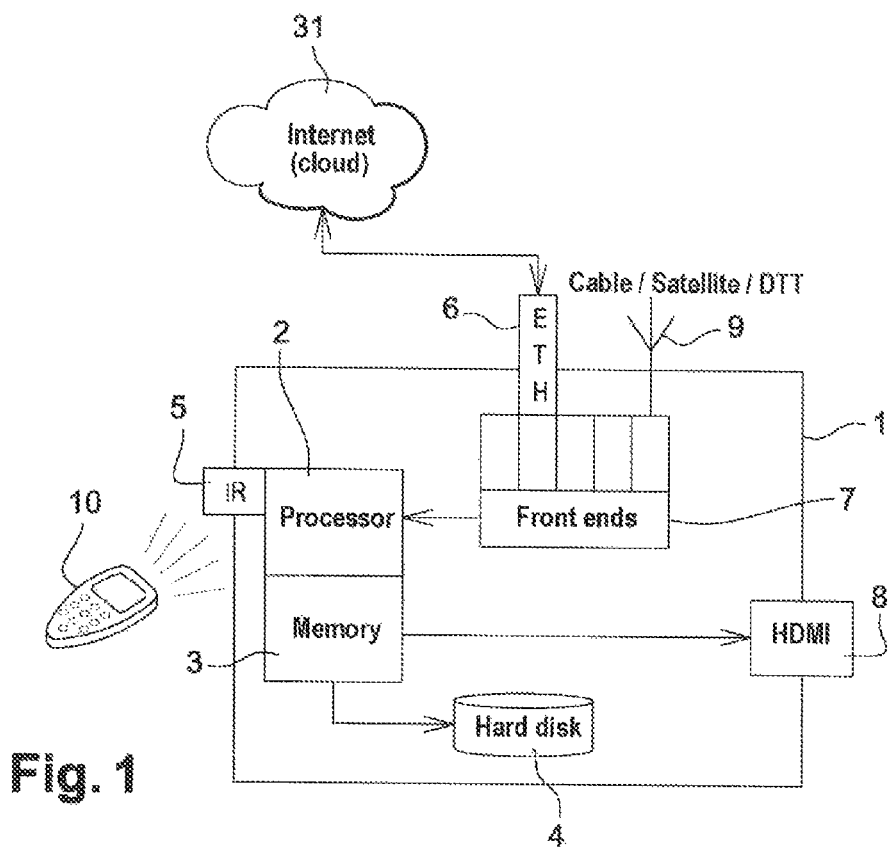
FIG. 1 shows a decoder box in which the recording method of the invention is performed.

The recording method of the invention in this example is performed in a decoder box 1, as shown in FIG. 1, which box is connected to a TV.

The decoder box 1 comprises a processor 2, a hard disk 4, an infrared port 5, an Ethernet port 6, a receive interface 7, an antenna 9, and an HDMI port 8.

The processor 2 of the decoder box 1 receives an external signal via the Ethernet port 6 or the antenna 9 and the receive interface 7, and transforms it into a video stream compatible with the TV. The video stream is transmitted to the TV via the HDMI port 8, and is played in the form of programs on the TV screen.

A user, watching programs played by the TV controls the decoder box 1 by means of a remote control 10 acting via the infrared port 5.

In this example, the decoder box 1 records broadcasting continuously while it is being viewed by the user and retains that recording at least over a recording period preceding the present viewing instant.

Figure 2:
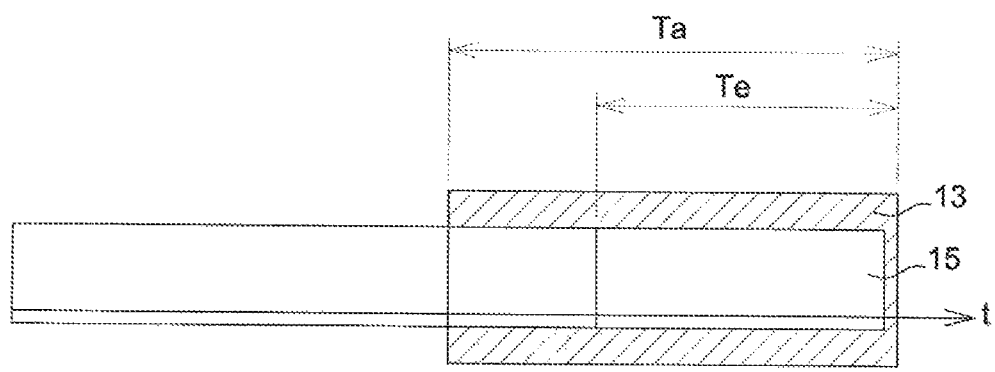
FIG. 2 is a graph, as a function of time, showing a continuous recording step performed in the recording method of the invention.

With reference to FIG. 2, the recording period Te of the broadcasting being viewed is recorded by means of a circular buffer 13. The recording period Te corresponds approximately to the duration of an advertising break, and by way of example it lies in the range 1 minute to 2 minutes. The recording period Te is longer than the mean duration Ta of a conventional trailer 15.

The broadcasting being viewed is thus recorded continuously over the recording period Te in a manner similar to the continuous recording that is performed in order to implement a time-shifting function. Naturally, with the time-shifting function, the recording period is much longer, and is conventionally equal to 1 hour, 2 hours, or even more.

A trailer is played by the TV. The trailer announces a forthcoming broadcast program that is to be broadcast on a particular broadcast channel. The forthcoming broadcast program may be a film, a TV game, a series, a sports event, etc.

The trailer comprises both a video signal and an audio signal. The trailer presents the user with a certain amount of programming information. The programming information is contained in the video signal and in the audio signal.

The programming information that may be contained in the video signal and in the audio signal may include, for example, the title of the forthcoming broadcast program, the broadcast channel, the start time of the forthcoming broadcast program, the end time of the forthcoming broadcast program, an actor or an announcer participating in the forthcoming broadcast program, etc.

By way of example, the programming information might contain in the audio signal, a theme tune and/or melody of the forthcoming broadcast program.

Figure 3:
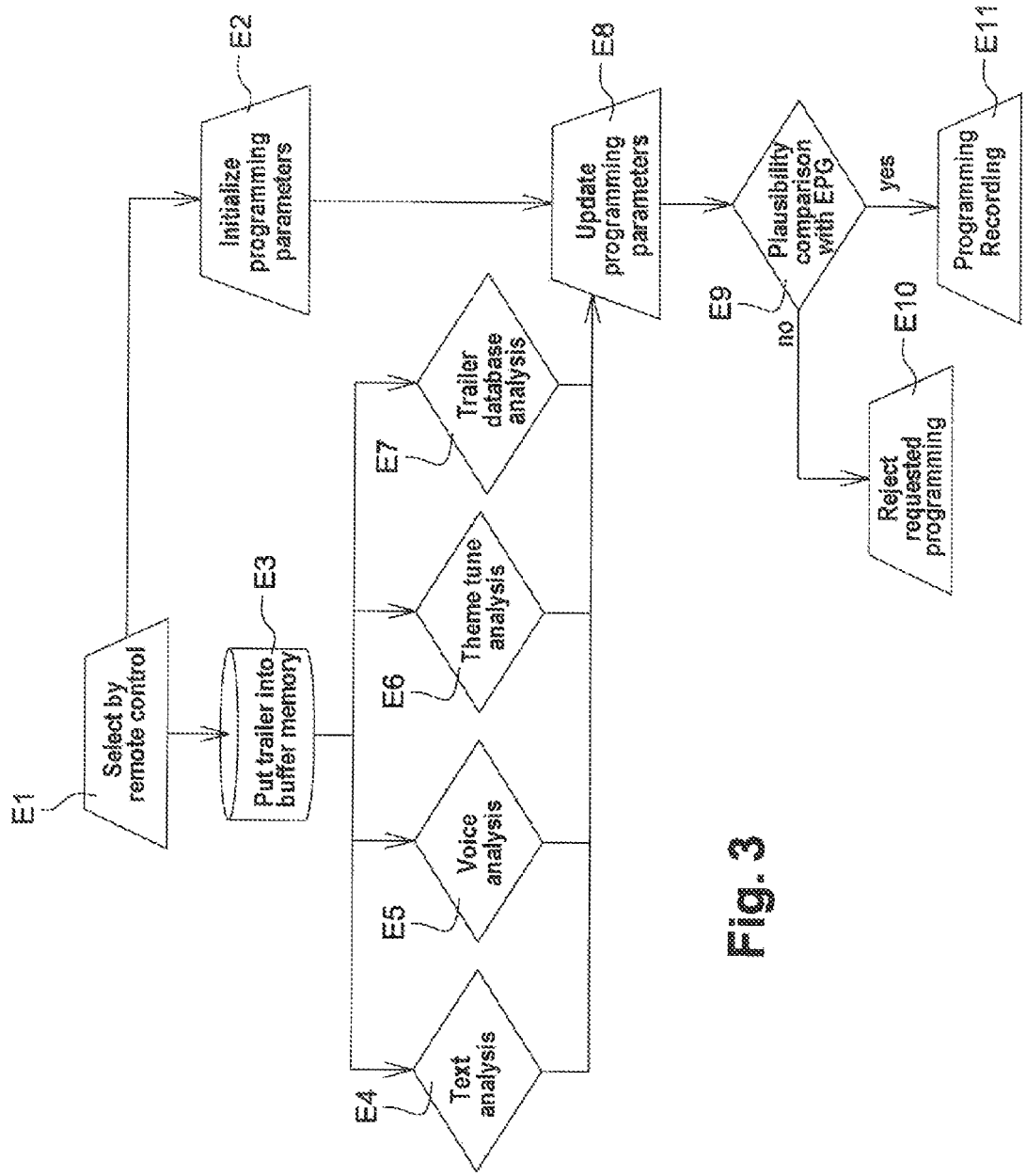
FIG. 3 shows the steps of the recording method of the invention.

With reference to FIG. 3, if the user is interested by the forthcoming broadcast program and desires to record it, the user presses on a button provided for this purpose on the remote control (step E1). The decoder box 1 then receives a recording request signal.

The processor 2 initializes programming parameters (step E2). In this example, the programming parameters are initialized with initial values of zero. In this example, the programming parameters are the start time of the forthcoming broadcast program, the end time of the forthcoming broadcast program, the title of the forthcoming broadcast program, and the repetitiveness of the forthcoming broadcast program (daily or weekly at the same time, e.g. as for a series).

The programming parameters differ from the programming information in that the programming information is produced for a user, not only in an attempt to persuade the user to watch the forthcoming broadcast program, but also to tell the user when the forthcoming broadcast program is going to be broadcast and on what channel. The programming parameters are for use by the decoder box 1 in order to program recording of the forthcoming broadcast program. One of the objects of the recording method of the invention is to extract the programming information from the recording of the broadcasting being viewed as recorded over the period prior to the recording request signal being received, in order to deduce therefrom the programming parameters.

The recording of the broadcasting being viewed as recorded prior to the recording request signal being received is then transferred into a memory zone 3 (step E3).

The processor 2 accesses the memory zone 3 and then analyzes the recording of the broadcasting being viewed over the recording period prior to the recording request signal being received.

In this example, the analysis performed by the processor 2 comprises four analyses that are performed simultaneously. The four analyses comprise a first analysis (step E4), a second analysis (step E5), a third analysis (step E6), and a fourth analysis (step E7).

The first analysis comprises performing optical character recognition. The optical character recognition is performed on the basis of images of the video signal of the trailer. Optical character recognition consists firstly in attempting to recognize, in each image, a text zone. When a text zone is recognized, the text zone is converted into text characters. An analysis of the text characters serves to determine the programming information contained in the text characters.

The optical character recognition performed in the first analysis is similar to the optical character recognition described in the document "*Video OCR: A survey and practitioner's guide, Rainer Lienhart, Intel Corporation; Chapter 6 of Video Mining Book, Editors: Azriel Rosenfeld, David Doermann, Daniel DeMenthon ISBN: 978-1-4419-5383-4 (Print) 978-1-4757-6928-9 (Online)*".

It should be observed that the first analysis may be performed on images lying within a small part of the video signal, and possibly on a single image. This reduces the resources of the processor 2 that are used for performing the first analysis. This is made possible by the fact that, as a general rule, text characters remain displayed on the TV screen for a certain length of time so as to give the user enough time to read them.

The second analysis comprises performing voice recognition. The voice recognition is performed on the audio signal of the trailer. The second analysis consists in analyzing the human voice present in the audio signal, and in transcribing it in the form of usable text. The usable text serves to determine programming information contained in the voice portion of the audio signal.

During the second analysis, other sound components of the audio signal are eliminated (music, sound effects). In order to eliminate the other sound components, frequencies that do not fall within the spectrum of the human voice are taken to be noise and eliminated by filtering.

The second analysis may perfectly well focus on recognizing programming information that is necessary and useful for determining the programming parameters. The voice recognition then focuses on recognizing such programming information in the words uttered. For this purpose, a comparison is performed with programming information available in the electronic program guide.

The third analysis comprises performing music recognition, specifically recognizing a theme tune or melody in the audio signal of the trailer. For this purpose, numerous broadcasts and TV series use a theme tune or melody that is specific and recognizable, and that is also used in the trailer. Recognizing the theme tune or melody relies on the following principles. After appropriate processing and filtering, a sample of the audio signal is compared with a central database. In the event of a match, information such as the name of the artist, the title of the song, and the title of the album are returned to the user. The title of the forthcoming broadcast program is obtained from that information about the theme tune or melody.

Finally, the fourth analysis consists in comparing the trailer with a predetermined database, in identifying the trailer, and in acquiring programming information associated with the identified trailer as stored in the database. The predefined database contains a large number of trailers that have previously been recorded, stored, and made available by operators or broadcasters.

In this example, direct recognition of the trailer consists in extracting it from the recording period and in sending it to an external server that is accessible via an Internet type network (cloud), via the Ethernet port. The external server compares it with the trailers in the database.

After the first analysis, the second analysis, the third analysis, and the fourth analysis, as described above, the processor 2 of the decoder box 1 makes use of the programming information in order to update the programming parameters (step E8).

The programming parameters are then compared with predefined parameters supplied by the electronic program guide, in order to verify the plausibility of the programming parameters (step E9). The purpose is specifically to verify that the forthcoming broadcast program, of title that has been defined, is indeed going to be broadcast from the determined start time on the determined broadcast channel. This serves to eliminate potential erroneous recordings.

When inconsistencies are detected, the recording request is rejected (step E10). The decoder box 1 then displays the standard programming menu of the decoder box 1 on the TV screen.

If the programming parameters are found to be plausible, then they are stored in memory, replacing the initial values.

The decoder box 1 thus uses the programming parameters in order to act automatically to program recording of the forthcoming broadcast program in the decoder box 1, without any other intervention on the part of the user (E11).

The forthcoming broadcast program is then recorded at the time the forthcoming broadcast program is broadcast.

It should be observed that if the first analysis, the second analysis, the third analysis, or the fourth analysis supply programming information that leads to programming parameters that are inconsistent, the "valid" programming parameters as defined in step E8 are obtained by using a majority rule. If there is no majority, then the programming parameters from the fourth analysis are given precedence.

Naturally, the invention is not limited to the implementation described, but covers any variant coming within the ambit of the invention as defined by the claims.

The term "broadcast program" is used herein to designate a program played on a TV. The broadcast program may perfectly well be played on some other source, and in particular by a sound-only source, such as a radio. The trailer is then only heard, but not viewed by the user.

The architecture of the decoder box may naturally be completely different. Internet access need not take place via an Ethernet port, but via any other means, e.g. via wireless communication means.

The recording method may be implemented in equipment other than a decoder box, for example in a module integrated in a TV.

The recording method described herein makes use of the first analysis, the second analysis, the third analysis, and the fourth analysis. It is nevertheless not necessary to perform all of those analyses.

It is stated that direct recognition of the trailer (during the fourth analysis) consists in particular in extracting the trailer from the recording period and in sending it to an external server. It is naturally possible to perform some other step, in full or in part, by means of an external server accessible via an Internet type network (and in particular the first analysis, the second analysis, or the third analysis).

The invention claimed is:

1. A recording method for recording a forthcoming broadcast program that is to be broadcast as announced by a trailer being viewed or heard by a user, the recording method comprising:
    continuously recording broadcasting that is being viewed by the user and conserving that recording at least over a recording period preceding the present viewing instant;
    while the trailer of the forthcoming broadcast program is playing, receiving a recording request signal issued by the user;
    analyzing only the recording of the broadcasting that is being viewed over the recording period preceding reception of the recording request signal in order to obtain programming parameters, said analyzing comprising:
        comparing the trailer of the forthcoming broadcast program with trailers in a database, and in obtaining the programming parameters from the programming information contained in the database; and
    recording the forthcoming broadcast program by using the programming parameters.

2. The recording method according to claim 1, wherein said analyzing includes performing optical character recognition.

3. The recording method according to claim 1, wherein said analyzing includes performing voice recognition.

4. The recording method according claim 1, wherein said analyzing includes performing music recognition.

5. The recording method according to claim 1, wherein said continuously recording is performed by means of a circular buffer.

6. The recording method according claim 1, wherein the recording method is performed by a decoder box and the recording request signal is issued by a remote control of the decoder box.

7. The recording method according claim 1, further comprising comparing the programming parameters with predefined parameters contained in an electronic program guide in order to verify the plausibility of the resulting programming parameters.

8. The recording method according to claim 1, wherein said analyzing is performed only after the user sends the recording request signal.

9. A decoder box including processor means arranged to perform the recording method according to claim 1.

10. A non-transitory, computer-readable storage medium tangibly embodying a computer program including instructions enabling equipment of the decoder box type to perform the recording method according to claim 1.

* * * * *